US012754092B2

(12) United States Patent
Sugibayashi

(10) Patent No.: US 12,754,092 B2

(45) Date of Patent: Oct. 6, 2026

(54) SENSOR DEVICE

(71) Applicant: Murata Manufacturing Co., Ltd., Nagaokakyo (JP)

(72) Inventor: Hideaki Sugibayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 770 days.

(21) Appl. No.: 18/109,313

(22) Filed: Feb. 14, 2023

(65) Prior Publication Data

US 2023/0194375 A1 Jun. 22, 2023

Related U.S. Application Data

(63) Continuation of application No. PCT/JP2021/027282, filed on Jul. 21, 2021.

(30) Foreign Application Priority Data

Aug. 28, 2020 (JP) ................................ 2020-144621

(51) Int. Cl.
*G01L 27/00* (2006.01)
*G01L 9/12* (2006.01)
(Continued)

(52) U.S. Cl.
CPC .............. *G01L 27/007* (2013.01); *G01L 9/12* (2013.01); *G01L 19/12* (2013.01); *G01L 19/141* (2013.01)

(58) Field of Classification Search
CPC ......... G01L 27/007; G01L 9/12; G01L 19/12; G01L 19/141; G01L 19/06; G01L 9/0072; H04R 17/00; H04R 19/04
See application file for complete search history.

(56) References Cited

U.S. PATENT DOCUMENTS

2015/0204744 A1* 7/2015 Kuisma ................. G01L 9/0041 73/718
2016/0334292 A1 11/2016 Oono
(Continued)

FOREIGN PATENT DOCUMENTS

JP 0712669 A 1/1995
JP 2001141592 A 5/2001
(Continued)

OTHER PUBLICATIONS

International Search Report in PCT/JP2021/027282, mailed Oct. 12, 2021, 3 pages.
(Continued)

*Primary Examiner* — Stephen D Meier
*Assistant Examiner* — Leo T Hinze
(74) *Attorney, Agent, or Firm* — Keating & Bennett, LLP

(57) ABSTRACT

A sensor device includes an electrically conductive base substrate defining a first electrode kept at a reference potential, a membrane defining a second electrode that changes a position thereof in response to a change of surrounding pressure and faces the base substrate, a casing that is kept at the reference potential and is outside the membrane, a capacitance detection circuit to amplify a signal from the membrane and detect an electrostatic capacitance between electrodes at a predetermined sampling cycle, and a signal processing circuit to measure a difference ΔC of electrostatic capacitance values before and after a sampling, compare the difference ΔC with a predetermined threshold value Cta, and when ΔC≥Cta, determine that a foreign object is attached to the casing. Thus, the attachment of a foreign object can be reliably detected.

18 Claims, 13 Drawing Sheets

(51) Int. Cl.
*G01L 19/12* (2006.01)
*G01L 19/14* (2006.01)

(56) References Cited

U.S. PATENT DOCUMENTS

| | | | | |
|---|---|---|---|---|
| 2018/0180505 | A1 | 6/2018 | Zipp et al. | |
| 2019/0383688 | A1* | 12/2019 | Balasubramanian | G01L 19/0092 |
| 2021/0072176 | A1* | 3/2021 | Han | G01N 27/07 |

FOREIGN PATENT DOCUMENTS

| | | | |
|---|---|---|---|
| JP | 2005337924 | A | 12/2005 |
| JP | 2006078422 | A | 3/2006 |
| JP | 2015165222 | A | 9/2015 |

OTHER PUBLICATIONS

Written Opinion in PCT/JP2021/027282, mailed Oct. 12, 2021, 3 pages.
Official Communication issued in corresponding Chinese Patent Application No. 202180053441.6, mailed on Feb. 24, 2025, 8 pages.
Yang et al., “Study on single planar capacitance sensor for water leakage detection”, Modern Electronics Technique vol. 37 No. 11, Jun. 2014, 4 pages.

* cited by examiner

SENSOR DEVICE

CROSS REFERENCE TO RELATED APPLICATIONS

This application claims the benefit of priority to Japanese Patent Application No. 2020-144621 filed on Aug. 28, 2020 and is a Continuation Application of PCT Application No. PCT/JP2021/027282 filed on Jul. 21, 2021. The entire contents of each application are hereby incorporated herein by reference.

BACKGROUND OF THE INVENTION

1. Field of the Invention

The present invention relates to a sensor device for measuring pressure such as atmospheric pressure, water pressure, or the like, and a pressure change of sound waves, ultrasonic waves, or the like.

2. Description of the Related Art

Pressure sensors can be fabricated using MEMS (micro-electromechanical system) technology to which semiconductor fabrication technologies are applied, and can be realized as, for example, microminiaturized sensors of about 0.5 mm to 2 mm squares. A typical pressure sensor has a capacitor structure including two electrodes and is capable of measuring pressure by detecting a change of electrostatic capacitance caused by a change of surrounding pressure. Such a capacitor structure may include air, one of various types of gas, an electric insulator, a piezoelectric substance, or the like in between the electrodes.

SUMMARY OF THE INVENTION

In related art pressure sensors, when a foreign object such as a water droplet or the like is attached due to submerging or condensation, in some cases, a detection window is occluded or distribution of electrical lines of force existing around the electrodes is disturbed, and this causes a measurement value to be changed.

However, if an external host that receives a signal from the pressure sensor does not recognize such a state where the foreign object is attached, the external host will handle the changed measurement value as a true value. As a result, there is a possibility that erroneous signal processing may be performed and that inaccurate information may be presented to a user.

Preferred embodiments of the present invention provide sensor devices each capable of reliably detecting attachment of a foreign object.

A sensor device according to one aspect of a preferred embodiment of the present invention includes a first electrode being kept at a reference potential, a second electrode that changes a position thereof in response to a change of surrounding pressure and faces the first electrode, a casing being kept at the reference potential and provided outside the second electrode, a capacitance detection circuit to amplify a signal from the second electrode and detect an electrostatic capacitance between the first electrode and the second electrode at a predetermined sampling cycle, and a signal processing circuit to measure a difference ΔC of electrostatic capacitance values before and after a sampling, compare the difference ΔC with a predetermined threshold value Cta, and when ΔC≥Cta, determine that a foreign object is attached to the casing.

A sensor device according to another aspect of another preferred embodiment of the present invention includes a first electrode being kept at a reference potential, a second electrode that changes a position thereof in response to a change of surrounding pressure and faces the first electrode, a casing being kept at the reference potential and provided outside the second electrode, a capacitance detection circuit to amplify a signal from the second electrode and detect an electrostatic capacitance between the first electrode and the second electrode, and a signal processing circuit to compare a detected electrostatic capacitance value Cs with a predetermined threshold value Ctb, and when Cs>Ctb, determine that a foreign object is attached to the casing.

According to preferred embodiments of the present invention, the attachment of a foreign object can be reliably detected.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
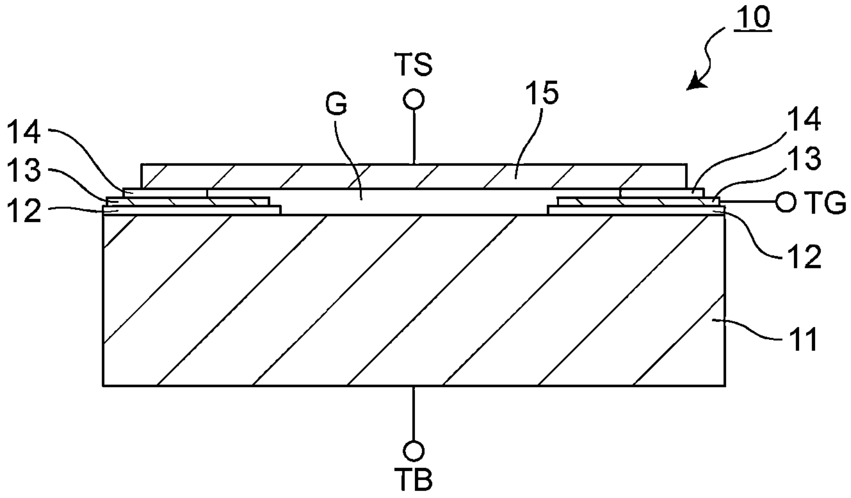
FIG. 1 is a sectional diagram illustrating one example of electrode structure of a sensor device according to a preferred embodiment 1 of the present invention.

A sensor device according to one aspect of a preferred embodiment of the present invention includes a first electrode being kept at a reference potential, a second electrode that changes a position thereof in response to a change of surrounding pressure and faces the first electrode, a casing being kept at the reference potential and provided outside the second electrode, a capacitance detection circuit to amplify a signal from the second electrode and detect an electrostatic capacitance between the first electrode and the second electrode at a predetermined sampling cycle, and a signal processing circuit to measure a difference ΔC of electrostatic capacitance values before and after a sampling, compare the difference ΔC with a predetermined threshold value Cta, and when ΔC≥Cta, determine that a foreign object is attached to the casing.

According to this configuration, the casing provided outside the second electrode is kept at the reference potential. When a foreign object such as a water droplet or the like is attached to the casing, a parasitic capacitance existing between the casing and the second electrode changes. Typically, the parasitic capacitance increases, and a detected electrostatic capacitance value increases accordingly. The signal processing circuit measures the difference ΔC of the electrostatic capacitance values and determines that a foreign object is attached to the casing when the difference ΔC is equal to or exceeds the predetermined threshold value Cta. Because of this, the attachment of a foreign object can be reliably detected.

A sensor device according to another aspect of another preferred embodiment of the present invention includes a first electrode being kept at a reference potential, a second electrode that changes a position thereof in response to a change of surrounding pressure and faces the first electrode, a casing being kept at the reference potential and provided outside the second electrode, a capacitance detection circuit to amplify a signal from the second electrode and detect an electrostatic capacitance between the first electrode and the second electrode, and a signal processing circuit to compare a detected electrostatic capacitance value Cs with a predetermined threshold value Ctb, and when Cs>Ctb, determine that a foreign object is attached to the casing.

According to this configuration, the casing provided outside the second electrode is kept at the reference potential. When a foreign object such as a water droplet or the like is attached to the casing, a parasitic capacitance existing between the first electrode and the second electrode changes. Typically, the parasitic capacitance increases, and a detected electrostatic capacitance value increases accordingly. The signal processing circuit determines that a foreign object is attached to the casing when the electrostatic capacitance value Cs exceeds a predetermined threshold value Ctb. Because of this, the attachment of a foreign object can be reliably detected.

In a preferred embodiment of the present invention, it is preferable that when the signal processing circuit determines that a foreign object is attached, a gain of the capacitance detection circuit, or a gain of the signal processing circuit, or gains of both the capacitance detection circuit and the signal processing circuit are adjusted.

According to this configuration, when a foreign object is attached, a detected value changes. In some cases, a detected value departs from a dynamic range of the measurement system and saturates to an upper limit value or a lower limit value. Thus, by decreasing or increasing the gain of a pressure detection circuit, or the gain of the signal processing circuit, or the gains of both the pressure detection circuit and the signal processing circuit, the detected values can be kept within the dynamic range.

In a preferred embodiment of the present invention, it is preferable that an interface circuit that transmits data between the signal processing circuit and an external host is further included, and an alarm signal is sent to the external host via the interface circuit when the signal processing circuit determines that a foreign object is attached.

According to this configuration, when the signal processing circuit determines that a foreign object is attached, by sending an alarm signal to the external host via the interface circuit, it becomes possible to notify the external host of the state where a foreign object is attached. This enables the external host to notify a user of presence of error in the information being presented to the user or to stop presentation of information to the user.

Preferred Embodiment 1

FIG. 1 is a sectional diagram illustrating one example of electrode structure of a sensor device according to preferred embodiment 1 of the present invention. This electrode structure 10 includes an electrically conductive base substrate 11 that defines and functions as a first electrode, a membrane 15 that defines and functions as a second electrode, and a spacer that maintains a gap G between the base substrate 11 and the membrane 15. When the base substrate 11 does not have electrical conductivity, an electrode may be added to an inner side surface of the base substrate 11. The spacer includes a guard electrode layer 13 and electrically insulating layers 12 and 14 arranged on both sides of the guard layer 13. Electrodes may be attached to the gap sides of the base substrate 11 and the membrane 15 for extraction to external terminals.

An electrostatic capacitance Cs between the electrodes is expressed as $Cs=\varepsilon\times S/d$ using a dielectric constant ε of the gap G, an electrode area S, and an inter-electrode distance d. When the membrane 15 is elastically deformed in response to the pressure difference between outside and the gap G, the inter-electrode distance d between the membrane 15 and the base substrate 11 changes, and the electrostatic capacitance Cs changes accordingly. The change of the electrostatic capacitance Cs is detected by an external circuit via a sense terminal TS.

In the case where the electrostatic capacitance between the base substrate 11 and the membrane 15 is measured, a positive voltage or a negative voltage is applied across a base terminal TB and the sense terminal TS at a constant cycle, and generated charges are extracted and subjected to an A/D (analog/digital) conversion. Subsequently, this A/D-converted signal is converted to an appropriate pressure value after the linearity and the temperature characteristic are compensated using digital computation.

The base substrate 11 and the membrane 15 are made of an electrically conductive material such as, for example, polycrystalline Si, amorphous Si, monocrystal Si, or the like. The electrically insulating layers 12 and 14 are made of an electrically insulating material such as silicon oxide. The guard electrode layer 13 is located between the membrane 15 and the base substrate 11, and this enables the cancellation of a floating electrostatic capacitance that does not relate to the pressure change.

Figure 2:
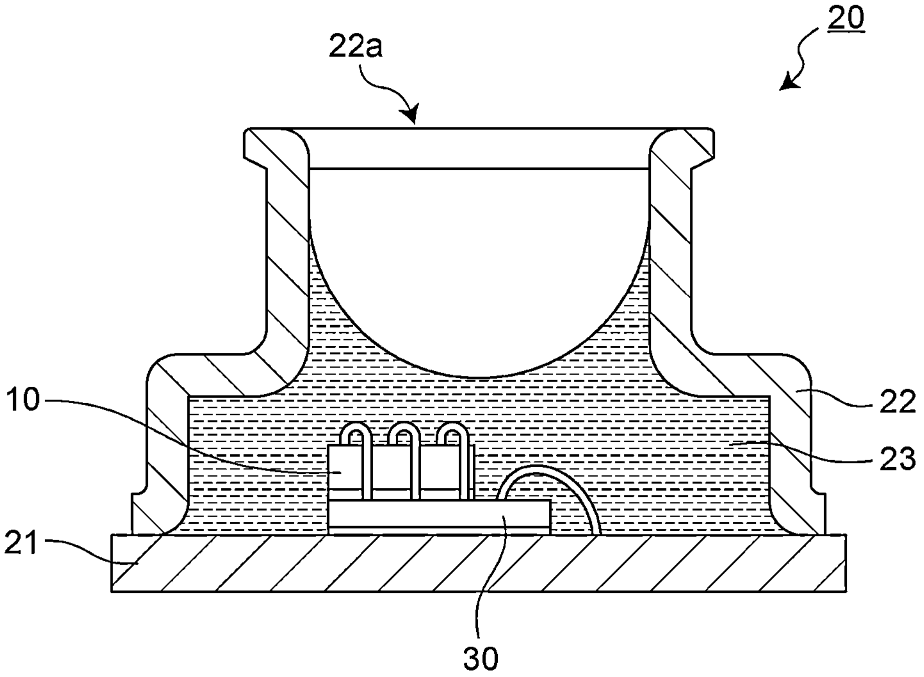
FIG. 2 is a sectional diagram illustrating one example of mechanical configuration of a sensor device according to the preferred embodiment 1 of the present invention.

FIG. 2 is a sectional diagram illustrating one example of mechanical configuration of a sensor device according to the preferred embodiment 1 of the present invention. A sensor device 20 includes a substrate 21, an integrated circuit 30 mounted on the substrate 21, the electrode structure 10 illustrated in FIG. 1, and a casing 22.

The integrated circuit 30 may be, for example, an ASIC, a FPGA, a PLD, a CPLD, or the like, and has a built-in analog circuit and a built-in programmable digital circuit. The electrode structure 10 can be mounted on the integrated circuit 30, and the electrode structure 10 and the integrated circuit 30 are electrically connected to each other using bonding wires. A wiring pattern, a power supply terminal, an interface terminal, and the like are provided on the substrate 21. On a top surface of this substrate 21, the integrated circuit 30 is mounted, and the integrated circuit 30 and the substrate 21 are electrically connected to each other using bonding wires.

The casing 22 is a tubular structure made of an electrically conductive material such as a metal or the like and has inner space to store the electrode structure 10 and the integrated circuit 30 that are fixed on the top surface of the substrate 21. At a top portion of the casing 22, an opening 22*a* is provided to allow the inner space to communicate with outside air. The inner space may be filled with air only or gel 23 as illustrated in FIG. 2. The gel 23 is used to seal the electrode structure 10 and the integrated circuit 30. Because of flexibility of the gel 23, the outside pressure can be transmitted to the electrode structure 10. Moreover, because of waterproof property, water-resisting property, and anticorrosive property of the gel 23, protection of the electrode structure 10 and the integrated circuit 30 is achieved.

Figure 3:
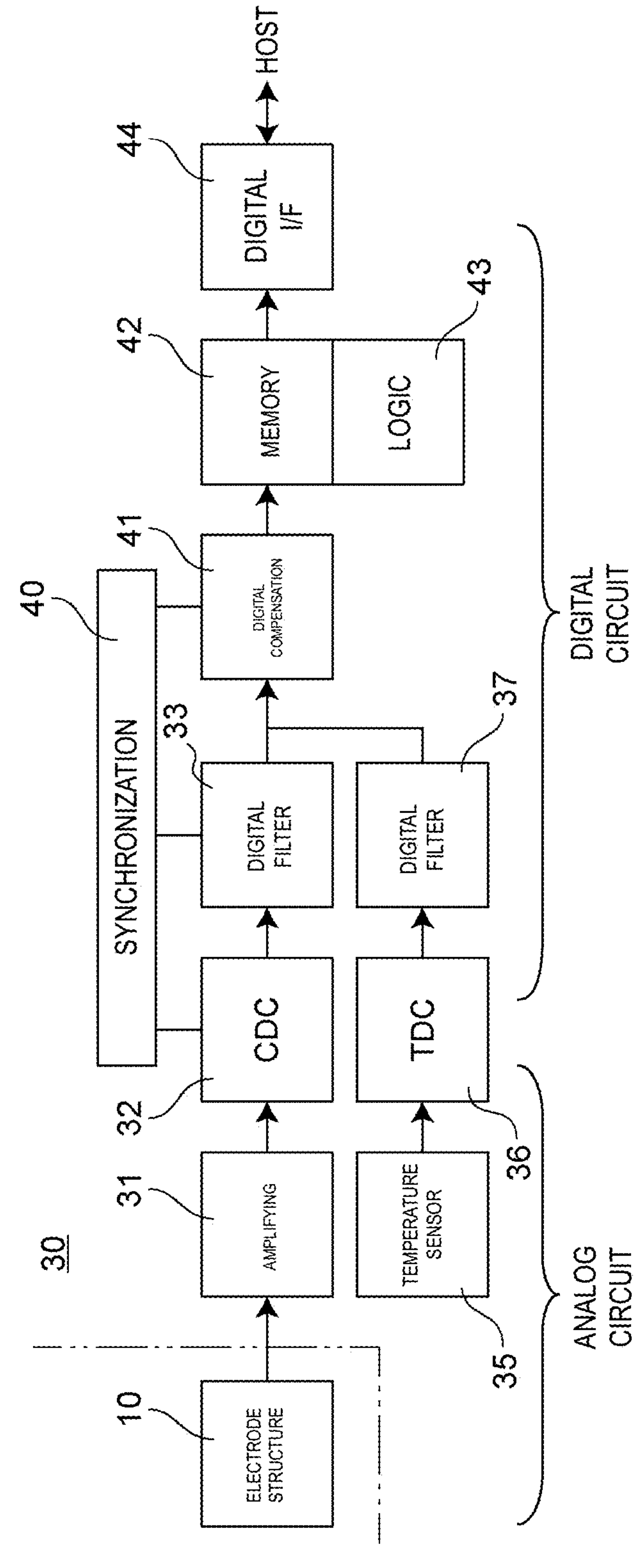
FIG. 3 is a block diagram illustrating one example of electrical configuration of a sensor device according to the preferred embodiment 1 of the present invention.

FIG. 3 is a block diagram illustrating one example of electrical configuration of a sensor device according to the preferred embodiment 1 of the present invention. The integrated circuit 30 includes an amplifier 31, a CDC (Capacitance to Digital Converter) circuit 32, a digital filter 33, a temperature sensor 35, a TDC (Temperature to Digital Converter) circuit 36, a digital filter 37, a synchronization circuit 40, a digital compensator 41, a memory 42, a logic 43, a digital I/F (interface) 44, and the like. Note that although it is not illustrated in the drawing, a pulse generator is provided between the electrode structure 10 and the amplifier 31 to supply a rectangular wave voltage to the electrode structure 10. The integrated circuit 30 such as the one described above can be installed as a combination of an arithmetic processor such as a CPU, a GPU, or the like, a memory such as an EEPROM, a RAM, or the like, software, and hardware such as an analog circuit or the like.

The amplifier 31 converts a charge signal from the electrode structure 10 described above into an analog pressure signal and amplifies this analog pressure signal up to an appropriate level. The CDC circuit 32 converts the pressure signal from the amplifier 31 into a digital signal. The digital filter 33 performs filtering on the digital signal from the CDC circuit 32, removes a high frequency noise component, and outputs a signal of a low frequency band.

The temperature sensor 35 includes a p-n junction diode, a thermistor, or the like, measures the temperature in the vicinity of the electrode structure 10, and outputs an analog temperature signal. The TDC circuit 36 converts the temperature signal from the temperature sensor 35 into a digital signal. The digital filter 37 performs filtering on the digital signal from the TDC circuit 36, removes a high frequency noise component, and outputs a signal of a low frequency band.

The digital compensator 41 compensates a digital pressure signal output from the digital filter 33 using a digital temperature signal from the temperature sensor 35 and a compensation factor stored in the memory 42 to perform temperature compensation and linearity compensation.

The synchronization circuit 40 supplies a clock having a predetermined cycle to the CDC circuit 32, the TDC circuit 36, and the digital filters 33 and 37 in order to synchronize digital operations. Based on this clock, a sampling cycle of the pressure signal is set. The clock may have a fixed single cycle or may have one of plural selectable cycles.

The memory 42 includes an EEPROM, a polyfuse, a RAM, or the like, and includes a register and a FIFO buffer. The register has the function of storing a variety of digital data such as measurement data, the compensation factors, and the like. The FIFO buffer temporally stores digital data and has the function of adjusting timings of input and output. Reading digital data in bulk enables the reduction of frequency of communications and the saving of energy consumption.

The digital interface 44 has the function of communicating with an external host, and sends and receives a variety of digital data. The external host is configured as a PC (personal computer), a smartphone, a portable electronic device, a wristwatch, or the like, and can be made up of a combination of an arithmetic processor such as a CPU, a GPU, or the like, a memory such as an EEPROM, a RAM, or the like, software, and hardware such as an analog circuit or the like. Further, the external host includes a similar communication interface.

The logic 43 has the function of storing various programs to be implemented by software. For example, the logic 43 stores therein programs such as a program that performs signal processing on measurement data stored in the memory 42, a program that controls the whole operation of the integrated circuit 30, a program that generates sending data (for example, an alarm) to the external host, a program that performs processing on received data from the external host, and the like.

Next, a characteristic compensation function of the digital compensator 41 is described. The sensor device 20 is shipped out after calibration of an absolute pressure value using a product tester at the time of a pre-shipment characteristic inspection. In calibration of the absolute pressure value, for example, initial values of a sensor output are measured in environments with temperatures of about −20° C./25° C./65° C. and a pressure range of about 30 kPa to 110 kPa. Based on these initial values, the compensation factors $a_{ij}$ (i and j are integers) are calculated, and these compensation factors are stored in a non-volatile memory included in the integrated circuit 30.

Next, when pressure sensing is actually performed in an electronic device equipped with the sensor device 20, the digital compensator 41 reads out the compensation factors $a_{ij}$ and performs a polynomial calculation using a measured pressure value and a temperature value to obtain the following final output p(L, T). In the following, $a_{ij}$ is the compensation factor for temperature/linearity, f(L) is a function for the linearity, and f(T) is a function for the temperature.

$$p(L,T)=\Sigma[a_{ij}\cdot f(L)\cdot f(T)] \quad (1)$$

These compensation calculations are performed in about 1 ms or less by the CPU included in the integrated circuit 30.

As a result, the temperature characteristic and the linearity are compensated, and a highly accurate absolute pressure value can be obtained within a use temperature range.

Next, various functions of the logic 43 are described. In one example, programs having the following functions are stored in the logic 43.

Figure 4A:
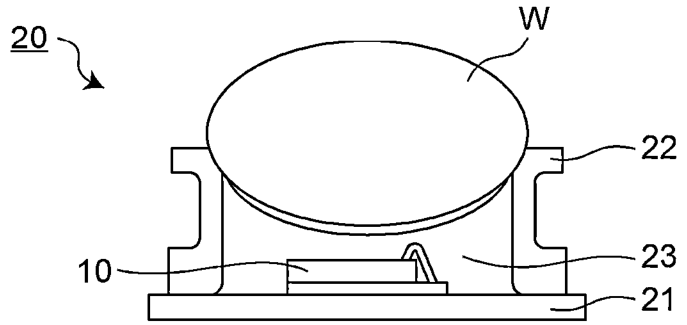
FIG. 4A is a sectional diagram illustrating a state where a water droplet is attached to an opening of the sensor device.
Figure 4B:
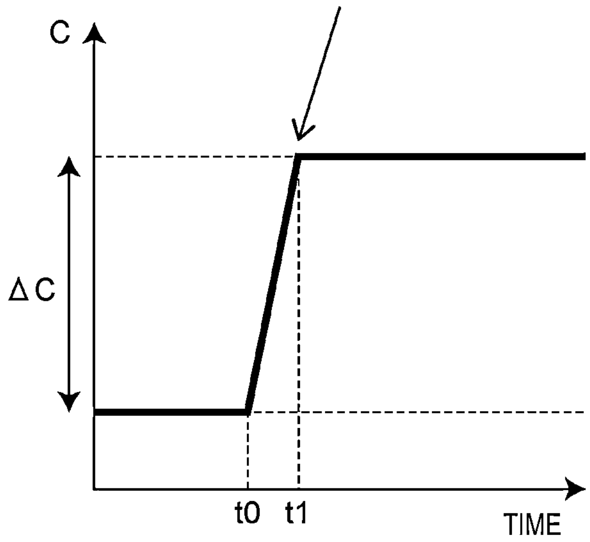
FIG. 4B is a graph illustrating time change of an electrostatic capacitance to be detected.
Figure 5:
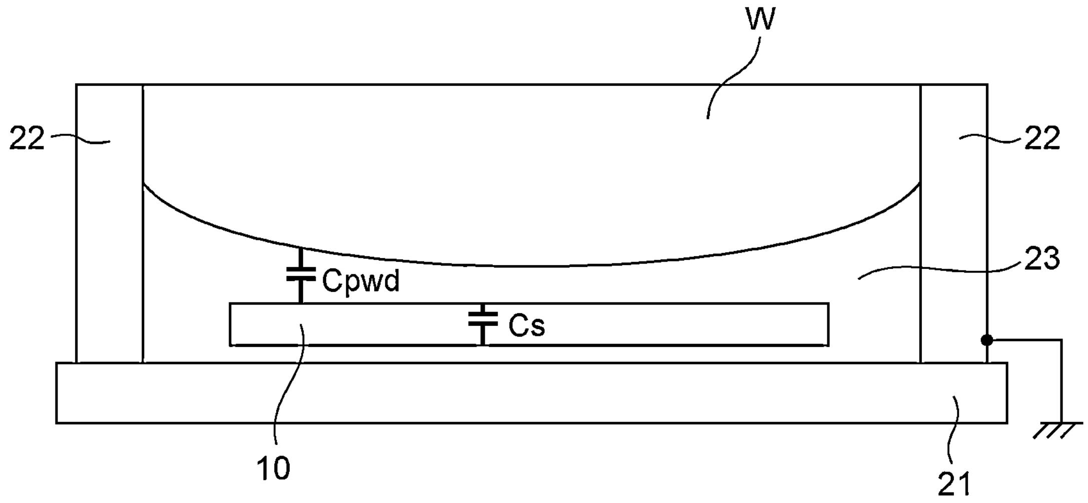
FIG. 5 is an explanatory diagram illustrating formation of a parasitic capacitance Cpwd caused by a water droplet W.

Water droplet detection function
Gain adjustment function
Threshold value/gain setting function
Gain initialization function
Alarm function
High speed ODR (Output Data Rate) function First, the water droplet detection function is described. FIG. 4A is a sectional diagram illustrating a state where a water droplet W is attached to the opening 22*a* of the sensor device 20. FIG. 4B is a graph illustrating time change of an electrostatic capacitance C to be detected. FIG. 5 is an explanatory diagram illustrating formation of a parasitic capacitance Cpwd caused by the water droplet W. The casing 22 is grounded and kept at a ground potential together with the base substrate 11.

When no water droplet W is attached, the membrane 15 of the sensor device 20 undergoes a flexural deformation in response to atmospheric pressure, and the atmospheric pressure can be accurately detected by measuring the electrostatic capacitance Cs between the electrodes. On the other hand, as illustrated in FIGS. 4A and 4B, in the case where the water droplet W starts touching the opening 22*a* at time t0 and the water droplet W attaches completely at time t1, an electrostatic capacitance ΔC caused by the water droplet W is added to the electrostatic capacitance Cs between the electrodes. In one example, the time period from time t0 to time t1 is about 1 ms (millisecond) or less, and ΔC is about 0.1 pF to about 10 pF.

Figure 6:
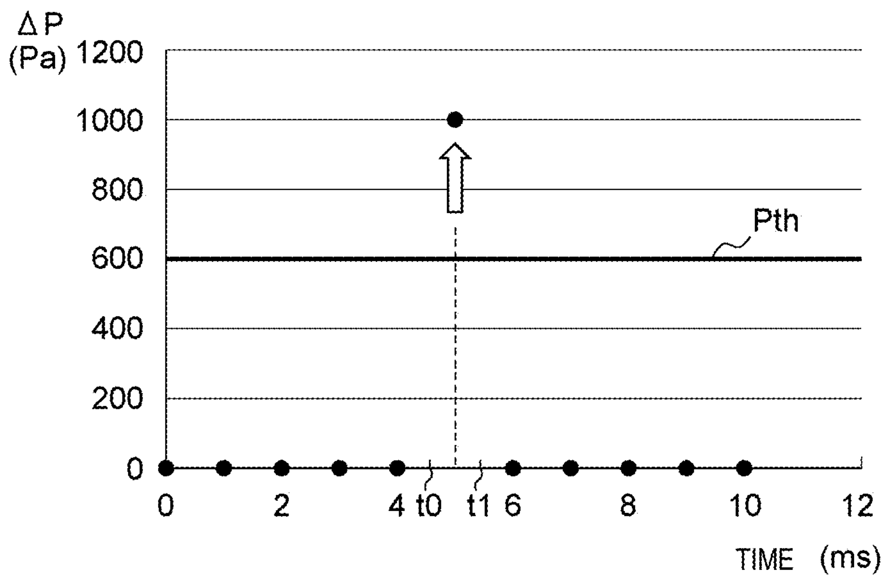
FIG. 6 is a graph illustrating time change of a difference ΔP of pressure values before and after sampling.

FIG. 6 is a graph illustrating the time change of a difference ΔP of pressure values before and after sampling. The difference ΔP of pressure values corresponds to a difference ΔC of electrostatic capacitances. When the atmospheric pressure does not change, the difference ΔP indicates zero. However, when the water droplet W attaches between time t0 to time t1, ΔP increases in a pulsed manner and then returns back to zero. At that time, the difference ΔP is compared with a predetermined threshold value Pth, and when ΔP≥Pth, it can be determined that the water droplet W is attached to the casing 22. The pressure threshold value Pth corresponds to a threshold value Cta of electrostatic capacitance.

Figure 7:
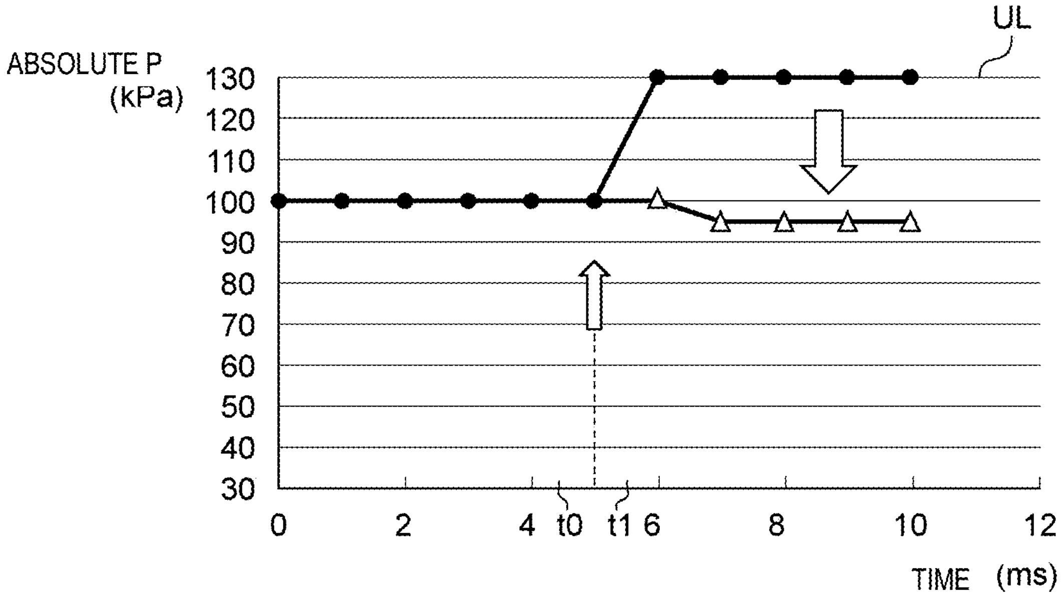
FIG. 7 is a graph illustrating time change of absolute pressure P output from a sensor device.

Next, the gain adjustment function is described. FIG. 7 is a graph illustrating the time change of absolute pressure P output from the sensor device 20. The absolute pressure P corresponds to the electrostatic capacitance Cs between the electrodes. When no water droplet W is attached, the absolute pressure P indicates 100 kPa, which corresponds to a pressure of about one atmosphere. In the case where no gain adjustment is performed, when the water droplet W is attached between time t0 to time t1, the absolute pressure P increases greatly due to an increase of the electrostatic capacitance ΔC caused by the water droplet W, departs from a dynamic range of the measurement system, and saturates to an upper limit value UL (here, 130 kPa). Once an output signal is saturated, the output signal becomes always constant and is a meaningless value.

On the other hand, when the attachment of water droplet is detected as described above, the gain adjustment function reduces the gain, and this enables the outputting of a signal corresponding to the change of atmospheric pressure as indicated by "Δ" mark in the graph. Accordingly, although the absolute pressure P includes an inherent error caused by the water droplet W, it becomes possible to present information about the relative change of pressure.

The gain adjustment may be performed by increasing or decreasing at least one of gains of respective blocks of the integrated circuit 30 or by using a program that performs signal processing on digital data in the logic 43.

Next, the threshold value/gain setting function and the gain initialization function are described. The threshold value Pth and the gains of respective blocks of the integrated circuit 30 described above can be stored in the memory 42 as initial values at the time of factory shipment and user setting values that can be set by the external host. Accordingly, the threshold value Pth and the gains of the integrated circuit 30 can be changed or initialized in accordance with a command or commands from the external host.

In one example, an initial gain before the attachment of water droplet and a gain after the attachment of water droplet are stored in advance in the memory 42. The gain may alternatively be reflected by multiplying the calculation result of the digital compensator 41 by this gain. The final output p(L,T,G) after the gain adjustment is expressed by the following formula (2). In the following, $a_{ij}$ is the compensation factor for temperature/linearity, f(L) is a function for the linearity, f(T) is a function for the temperature, and G is the gain.

$$p(L,T,G)=\Sigma[a_{ij}\cdot f(L)\cdot f(T)]\times G \quad (2)$$

For example, in the case where an initial gain Gi and a gain Gwd after the attachment of water droplet are set as Gi=1.0 and Gwd=0.1, the gain will be switched to 1/10 when compared before and after the attachment of water droplet, and the signal saturation caused by the water droplet can be avoided. Subsequently, at the right time when the water droplet evaporates, the gain may be reset to the initial gain. According to this, the normal pressure measurement can be resumed.

Next, the alarm function is described. When the attachment of water droplet is detected as described above, alarm information stored in the memory 42 in advance can be sent to the external host via the digital interface 44. The alarm information may be in a form of text data or binary data or may be in a form of an interrupt signal of external output of hardware. For example, when the attachment of water droplet is detected, a water droplet detection bit (flag) set at a predetermined address of the memory 42 may be switched from 0 to 1, and this flag information may be sent to the external host in accordance with a serial communications protocol such as SPI/I2C or the like. Alternatively, the flag information may be transferred to an interrupt register that displays an occurrence of water droplet attachment event, and this may be read out by the external host. Still alternatively, an interrupt signal whose output level is switched from 0 to 1 may be output via an external output terminal of the integrated circuit 30. In this case, a real-time notification can be achieved.

Upon receipt of the alarm from the integrated circuit 30, the external host can recognize that the sensor device 20 is in a non-steady state. This enables the external host to notify a user of presence of error in the information being presented to the user or to stop presentation of information to the user.

Next, the high speed ODR (Output Data Rate) function is described. The synchronization circuit 40 may be configured to selectively generate clocks of plural frequencies, for example, a low frequency clock and a high frequency clock. By increasing the frequency of the clock generated by the synchronization circuit 40, the time required for a single pressure measurement is shortened, and the total measurement time is also shortened. Thus, the high speed ODR can be realized. For example, when 128 samplings are performed with a clock frequency of 66 kHz (a period of 15.1 μs), the measurement time is 15.1 μs×128=1940 μs. On the other hand, when 128 samplings are performed with a doubled clock frequency, which is 132 kHz (a period of 7.6 μs), the measurement time is 7.6 μs×128=970 μs. Thus, the total measurement time can be shortened. When the measurement is performed continuously, the pressure value can be obtained every approximately 970 μs, for example.

By using such a high speed ODR technique, a high speed rate pressure measurement is performed to monitor the pressure difference ΔP between two consecutive sampling times. For example, when ODR=1000 Hz, the pressure difference ΔP can be obtained every approximately 1 ms, for example. By its nature, the outside atmospheric pressure does not make an abrupt excessive change on the order of ms, and an abrupt pressure change happens only when a water droplet is attached. Therefore, when the difference ΔP is compared with the predetermined threshold value Pth and the inequality ΔP≥Pth is satisfied, it can be determined that the water droplet W is attached to the casing 22.

Figure 8:
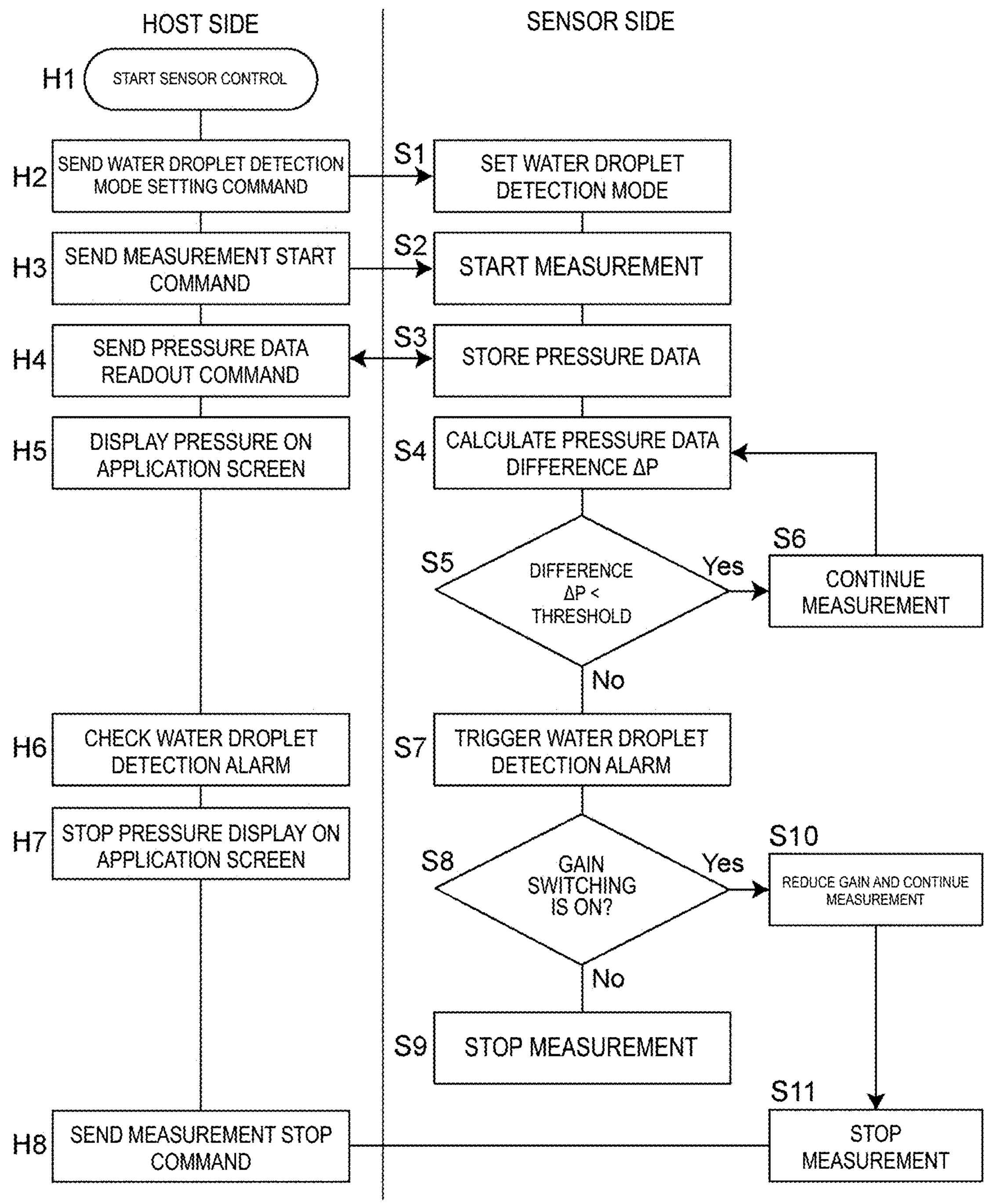
FIG. 8 is a flowchart illustrating one example of operations of an external host and a sensor device.

FIG. 8 is a flowchart illustrating one example of operations of the external host and the sensor device. When a user activates a pressure measurement application installed in a host, the host starts a sensor control flow in step H1. Next, in step H2, the host sends to a sensor a command for setting necessary parameters for a water droplet detection mode. In step S1, the sensor stores the necessary parameters (for example, the sampling rate, the threshold value Pth, on/off of the gain switching) for the water droplet detection mode in a memory.

Next, in step H3, the host sends to the sensor a command for starting a pressure measurement. In step S2, the sensor starts a pressure measurement and subsequently stores measured pressure data in the memory in step S3. Next, in step H4, the host sends to the sensor a command for reading out pressure data and receives the measured pressure data. Next, in step H5, the host displays a measured pressure on a screen of the pressure measurement application. Steps S3, H4, and H5 are performed simultaneously with other steps using multitask processing.

Subsequently, the sensor calculates the difference ΔP of pressure data before and after a sampling in step S4 and compares the difference ΔP with the predetermined threshold value Pth in step S5. When the difference ΔP is smaller than the threshold value Pth (ΔP<Pth), the flow proceeds to step S6. There, the sensor determines that the pressure measurement should be continued, and the flow returns to step S4. On the other hand, when ΔP≥Pth, the flow proceeds to step S7. There, the sensor determines that a water droplet is attached to the sensor and triggers a water droplet detection alarm. In this case, for example, an interrupt output terminal may be changed from a low level to a high level, or a flag may be set in a status register.

Subsequently, in step S8, the sensor checks whether the gain switching is on or off. When the gain switching is off, the flow proceeds to step S9, and the sensor stops the measurement without switching the gain. On the other hand, when the gain switching is on, the flow proceeds to step S10, and the sensor continues the measurement after the gain is lowered.

On the other hand, in step H6, the host checks the water droplet detection alarm from the sensor. Next, in step H7, the host stops the display of pressure on the screen of the pressure measurement application. At that time, a message of alarm generation may be displayed. Next, in step H8, the host sends to the sensor a command for stopping the pressure measurement. In step S11, the sensor stops the pressure measurement.

As described above, according to the present preferred embodiment, it becomes possible to accurately detect the attachment of water droplet. Moreover, it is preferable to perform the gain switching after the attachment of water droplet. Because of this, the saturation of the measurement value to the upper limit value or the lower limit value of the dynamic range can be avoided, and the measurement can be continued.

Further, it becomes possible to notify a user, who is using the host, of the water droplet detection alarm. Thus, the user can recognize that the sensor is in the non-steady state.

Further, with digital signal processing of the integrated circuit, a water droplet detection flow, a gain adjustment flow, an alarm triggering flow, or the like can be easily implemented by programming. Further, the integration can be achieved using simple logic circuits. Thus, a high added value can be realized while suppressing an increase in the chip area or the cost.

Preferred Embodiment 2

Figure 9:
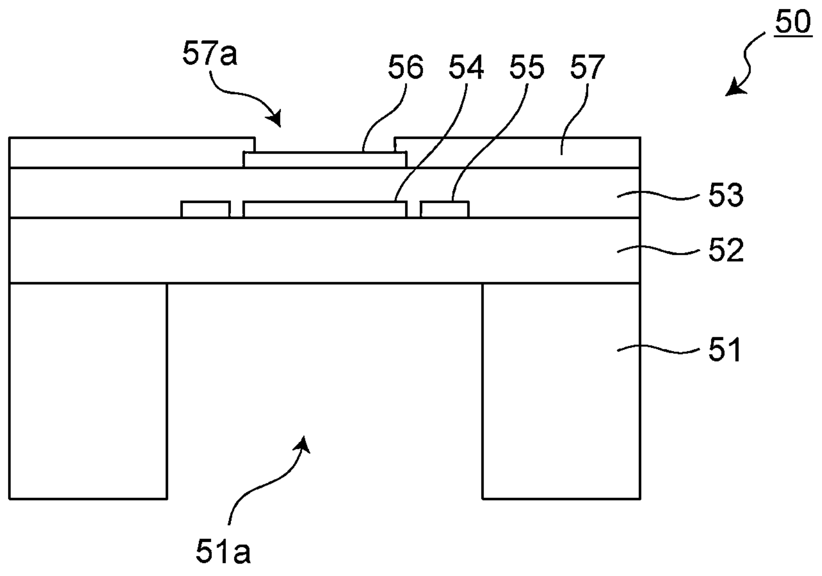
FIG. 9 is a sectional diagram illustrating one example of electrode structure of a sensor device according to a preferred embodiment 2 of the present invention.

FIG. 9 is a sectional diagram illustrating one example of electrode structure of a sensor device according to preferred embodiment 2 of the present invention. This electrode structure 50 can be used as a pMUT (Piezo Micro-machined Ultrasonic Transducer) that transmits/receives ultrasonic waves, and in one example, includes a substrate 51 such as silicon or the like, a support layer 52 such as AlN or the like, a piezoelectric layer 53 such as AlN, KNN, PZT, or the like, a lower electrode 54 that defines and functions as the first electrode, a heater 55, an upper electrode 56 that defines and functions as the second electrode, and a protective film 57 such as AlN or the like, which defines and functions as a casing. The substrate 51 is provided with a window 51*a* through which ultrasonic waves pass.

Figure 10:
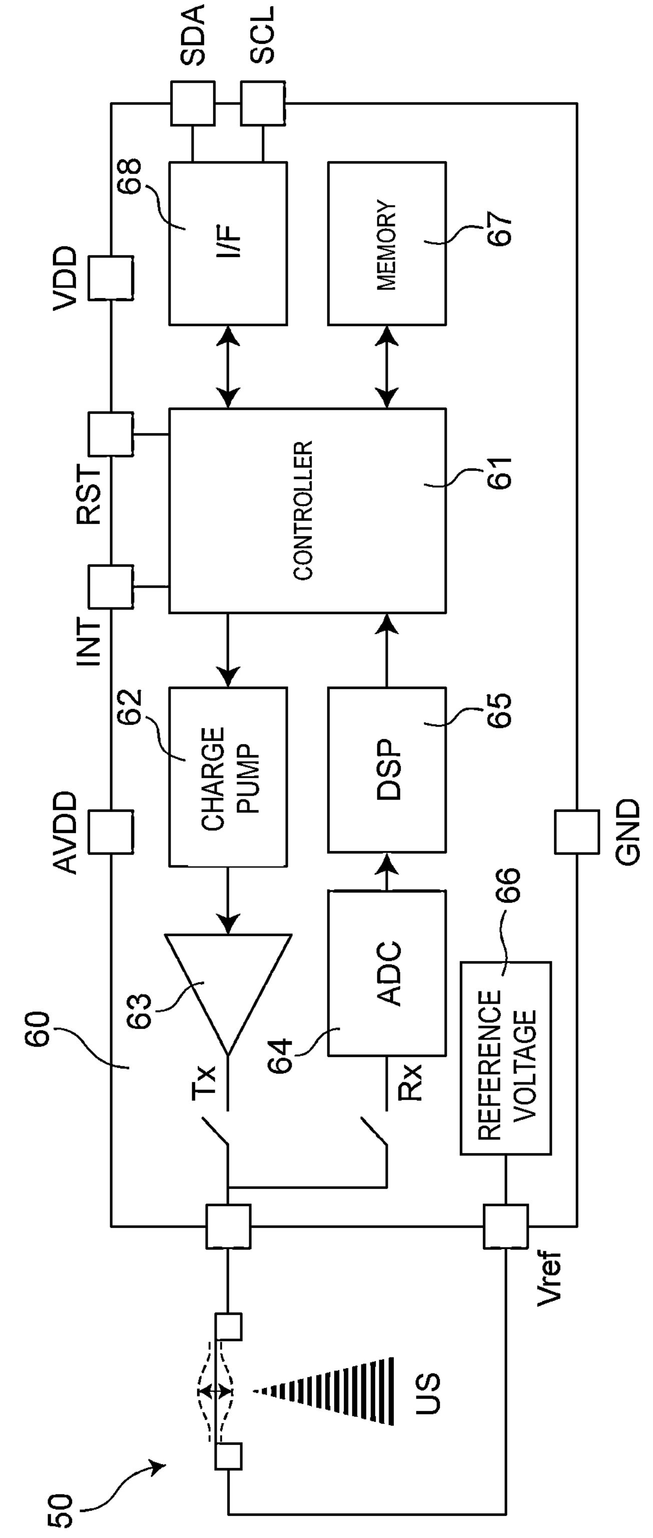
FIG. 10 is a block diagram illustrating one example of electrical configuration of a sensor device according to the preferred embodiment 2 of the present invention.

FIG. 10 is a block diagram illustrating one example of electrical configuration of the sensor device according to the preferred embodiment 2 of the present invention. An integrated circuit 60 includes a controller 61 such as an CPU or the like, a charge pump circuit (booster circuit) 62, an amplifier 63, an ADC (Analog to Digital Convertor) circuit 64 that has a band pass characteristic, a DSP (Digital Signal Processor) circuit 65, a reference voltage circuit 66, a memory 67, an I/F (interface) circuit 68 such as I2C or the like, and other similar circuits. A switch circuit alternately connects the upper electrode 56 to the amplifier 63 and to the ADC circuit 64. The lower electrode 54 is connected to the reference voltage circuit 66. The band pass characteristic may be provided by a digital filter after AD conversion in the ADC.

With regard to the operation of the sensor device, for example, when a drive signal of about 20 kHz to about 500 kHz in frequency is applied across the lower electrode 54 and the upper electrode 56 in a pulsed manner, the piezoelectric layer 53 vibrates because of a piezo effect, and an ultrasonic wave US, which changes air pressure, is emitted to outside through the window 51*a*. An emitted ultrasonic wave US is reflected at an object, returns through the window 51*a*, and vibrates the piezoelectric layer 53. At this time, because of the piezo effect, a pulse signal is generated between the lower electrode 54 and the upper electrode 56. The distance from the sensor to the object can be measured by measuring time from the drive signal to the pulse signal.

A function of detecting a foreign object such as a water droplet or the like can be added to such a sensor device. In one example, as illustrated in FIG. 9, an opening 57*a* that exposes the upper electrode 56 is formed in the protective film 57. An electrically conductive thin film is provided on a top surface of the protective film 57, and this thin film is kept at a reference voltage (for example, the ground potential) together with the lower electrode 54.

Figure 11:
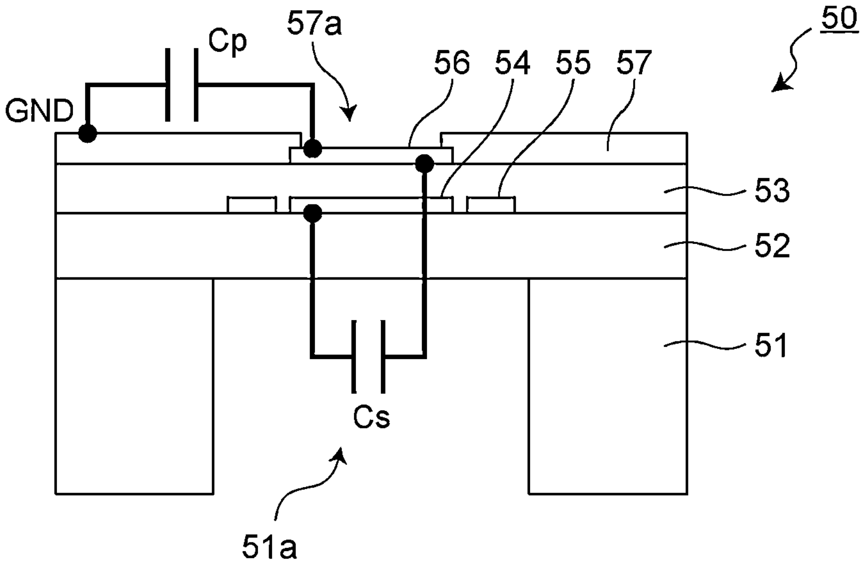
FIG. 11 is an explanatory diagram illustrating a parasitic capacitance caused by attachment of water droplet.

FIG. 11 is an explanatory diagram illustrating a parasitic capacitance caused by the attachment of water droplet. The opening 57*a* that exposes the upper electrode 56 is located in the protective film 57. The electrically conductive thin film is provided on the top surface of the protective film 57, and this thin film is kept at the reference voltage (for example, the ground potential) together with the lower electrode 54. The electrostatic capacitance Cs to be detected exists in between the lower electrode 54 and the upper electrode 56. When a water droplet is attached to the opening 57*a*, the upper electrode 56 is capacitively coupled with the electrically conductive thin film, and a new parasitic capacitance Cp caused by the water droplet is added in parallel to the electrostatic capacitance Cs.

Figure 12:
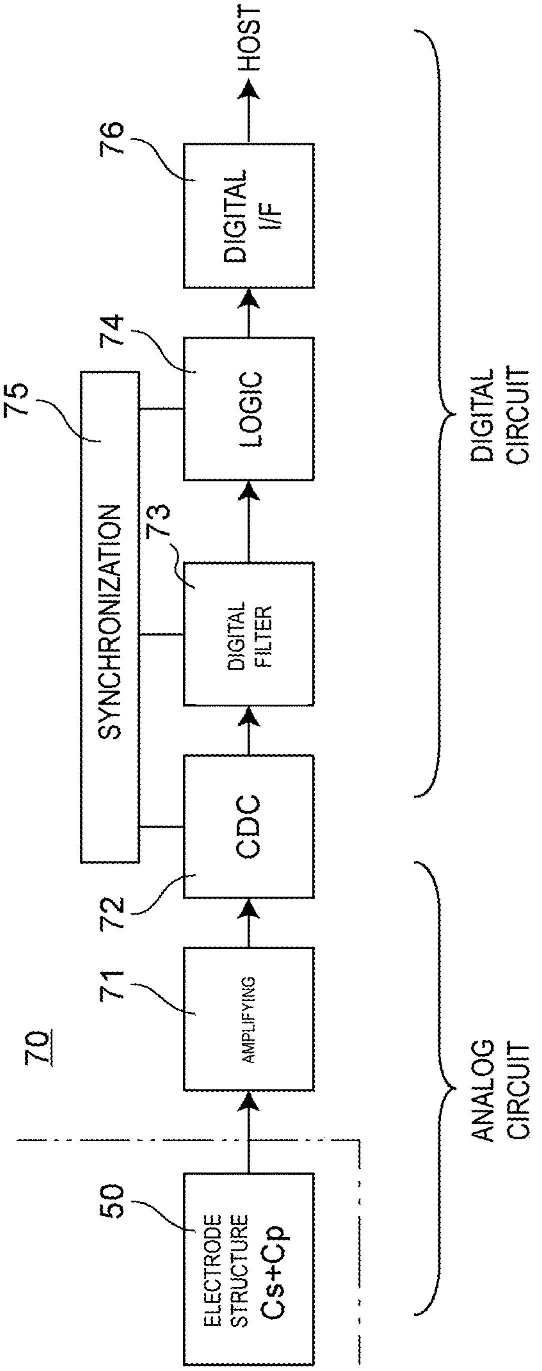
FIG. 12 is a block diagram illustrating one example of a water droplet detection circuit of a sensor device according to the preferred embodiment 2 of the present invention.

FIG. 12 is a block diagram illustrating one example of a water droplet detection circuit of the sensor device according to the preferred embodiment 2 of the present invention. An integrated circuit 70 includes an amplifier 71, a CDC circuit 72, a digital filter 73, a synchronization circuit 75, a logic 74, a digital interface 76, and the like. Note that although it is not illustrated in the drawing, a pulse generator is provided between the electrode structure 50 and the amplifier 71 to supply a rectangular wave voltage to the electrode structure 50. The integrated circuit 70 such as the one described above can be installed as a combination of an arithmetic processor such as a CPU, a GPU, or the like, a memory such as an EEPROM, a RAM, or the like, software, and hardware such as an analog circuit or the like.

The amplifier 71 converts a charge signal from the electrode structure 50 described above into an analog pressure signal and amplifies this analog pressure signal up to an appropriate level. The CDC circuit 72 converts the pressure signal from the amplifier 71 into a digital signal. The digital filter 73 performs filtering on the digital signal from the CDC circuit 72, removes a high frequency noise component, and outputs a signal of a low frequency band.

The logic 74 has the function of storing various programs to be implemented by software. For example, the logic 74 stores therein programs such as a program that performs signal processing on measurement data stored in the memory, a program that controls the whole operation of the integrated circuit 70, a program that generates sending data (for example, alarm) to the external host, a program that performs processing on received data from the external host, and the like.

The synchronization circuit 75 supplies a clock having a predetermined cycle to the CDC circuit 72, the digital filter 73, and the logic 74 in order to synchronize digital operations. Based on this clock, the sampling cycle is set.

The digital interface 76 has the function of communicating with an external host, and sends and receives a variety of digital data.

Next, the operation of water droplet detection is described. In the state where the lower electrode 54 is disconnected from the reference voltage circuit 66 and no water droplet is attached, Cs_max which is the maximum value of Cs is measured and stored in the memory as a threshold value Ctb in advance. When a water droplet is attached, a parasitic capacitance Cp is generated, and the inter-electrode capacitance Cs changes to Cs+Cp. In a diagnostic mode of water droplet attachment, the inter-electrode capacitance Cs is measured periodically. In this case, Cs is measured by inputting a rectangular pulse to the upper electrode 56. When Cs>Ctb, it can be determined that a water droplet is attached.

Alternatively, the difference ΔC of electrostatic capacitance values before and after a sampling can be measured, and this difference ΔC can be compared with a predetermined threshold value Cta. When ΔC≥Cta, it can be determined that a water droplet is attached.

When the determination of water droplet attachment is made as described above, as is the case with the preferred embodiment 1, the gain adjustment function for the circuitry system and the alarm function can be similarly performed.

Preferred Embodiment 3

Figure 13:
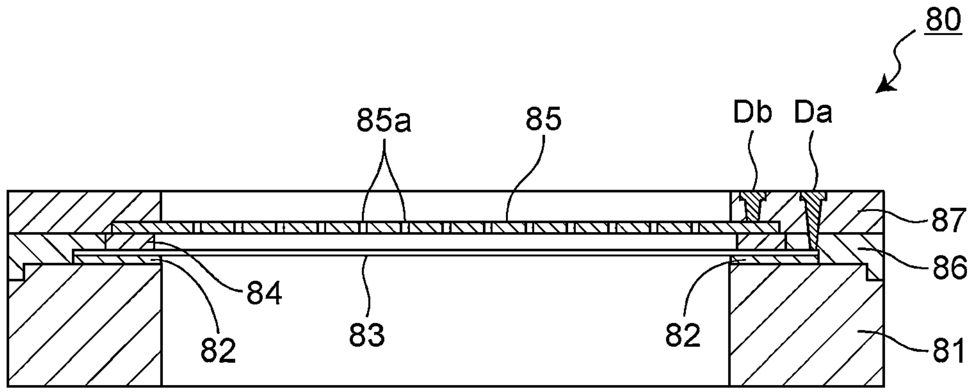
FIG. 13 is a sectional diagram illustrating one example of electrode structure of a sensor device according to a preferred embodiment 3 of the present invention.

FIG. 13 is a sectional diagram illustrating one example of electrode structure of a sensor device according to preferred embodiment 3 of the present invention. This electrode structure 80 can be used as a MEMS (Micro Electro Mechanical Systems) microphone that converts a sound wave into an electrical signal, and in one example, includes a substrate 81 such as silicon or the like, an electrically insulating layer 82, an electrically conductive vibration plate 83 that defines and functions as a second electrode, an electrically insulating spacer 84, an electrically conductive back electrode plate 85 that defines and functions as the first electrode, and electrically insulating layers 86 and 87. On the electrically insulating layers 86 and 87, an electrode Da connected to the vibration plate 83 and an electrode Db connected to the back electrode plate 85 are provided. On the back electrode plate 85, a number of through holes 85*a*, through which a sound wave passes, are provided.

Figure 14:
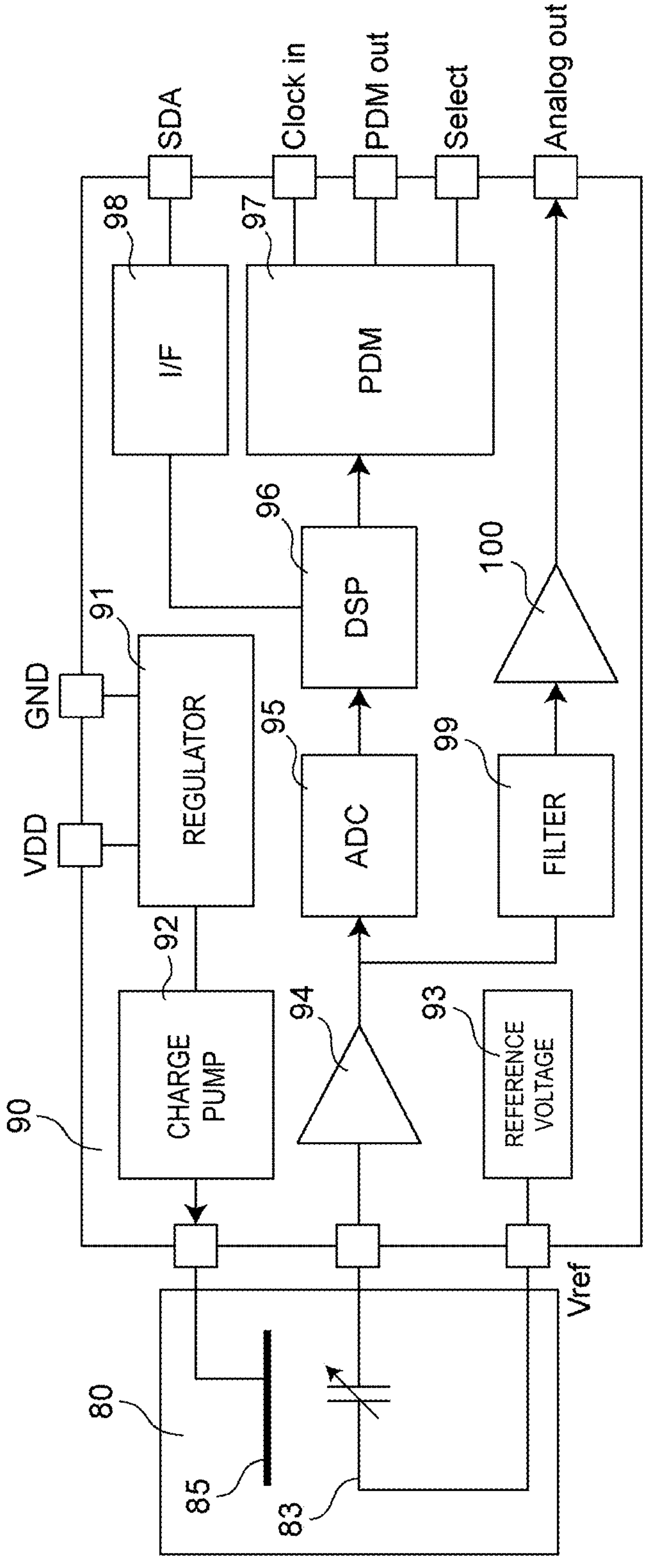
FIG. 14 is a block diagram illustrating one example of electrical configuration of a sensor device according to the preferred embodiment 3 of the present invention.

FIG. 14 is a block diagram illustrating one example of electrical configuration of the sensor device according to the preferred embodiment 3 of the present invention. An integrated circuit 90 includes a voltage regulator 91, a charge pump circuit 92, a reference voltage circuit 93, an amplifier 94, an ADC (Analog to Digital Convertor) circuit 95, a DSP (Digital Signal Processor) circuit 96, a PDM (Pulse Density Modulation) circuit 97, an I/F (interface) circuit 98 such as I2C or the like, a filter circuit 99, a buffer circuit 100, and the like. The back electrode plate 85 is connected to the charge pump circuit (booster circuit) 92 and is kept at a predetermined DC voltage. The vibration plate 83 is connected to the reference voltage circuit 93 and the amplifier 94 and is kept at a predetermined reference voltage.

With regard to the operation of the sensor device, a DC voltage is applied across the vibration plate 83 and the back electrode plate 85. A sound wave arrives from above, passes through the through hole 85*a*, and vibrates the vibration plate 83. At this time, the inter-electrode distance changes, and the electrostatic capacitance Cs between the electrodes also changes. Further, the voltage of the vibration plate 83 changes. This voltage signal is amplified, and the amplified signal is converted into a digital signal by the ADC circuit 95. This amplified signal is also used as an analog signal via the filter circuit 99. As described above, a sound wave, which changes air pressure, is converted into an electrical signal.

Figure 15:
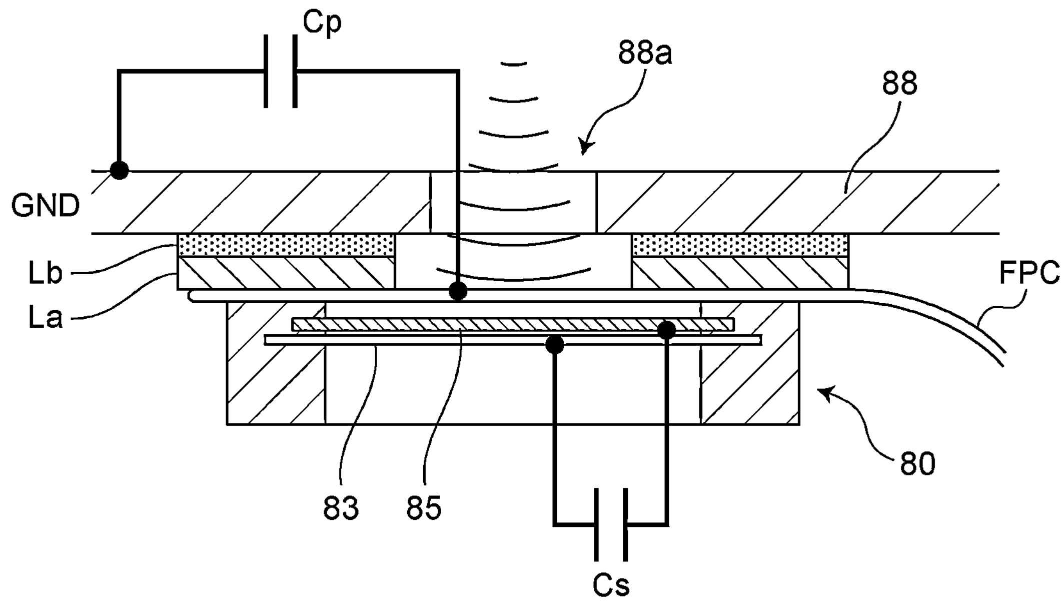
FIG. 15 is an explanatory diagram illustrating a parasitic capacitance caused by attachment of water droplet.

A function of detecting a foreign object such as a water droplet or the like can be added to such a sensor device. In one example, as illustrated in FIG. 15, a FPC (flexible printed circuit board) having conductors is fixed on the electrode structure 80, and furthermore, a casing 88 made of an electrically conductive material is fixed thereon with an electrically insulating reinforcement plate La and an adhesive Lb interposed therebetween. The casing 88 is provided with an opening 88*a* through which a sound wave passes. The casing 88 is kept at a reference voltage (for example, the ground potential). The electrostatic capacitance Cs to be detected exists in between the vibration plate 83 and the back electrode plate 85. When a water droplet is attached to the opening 88*a*, the conductor of the FPC is capacitively coupled with the casing 88, and a new parasitic capacitance Cp caused by the water droplet is added in parallel to the electrostatic capacitance Cs.

Figure 16:
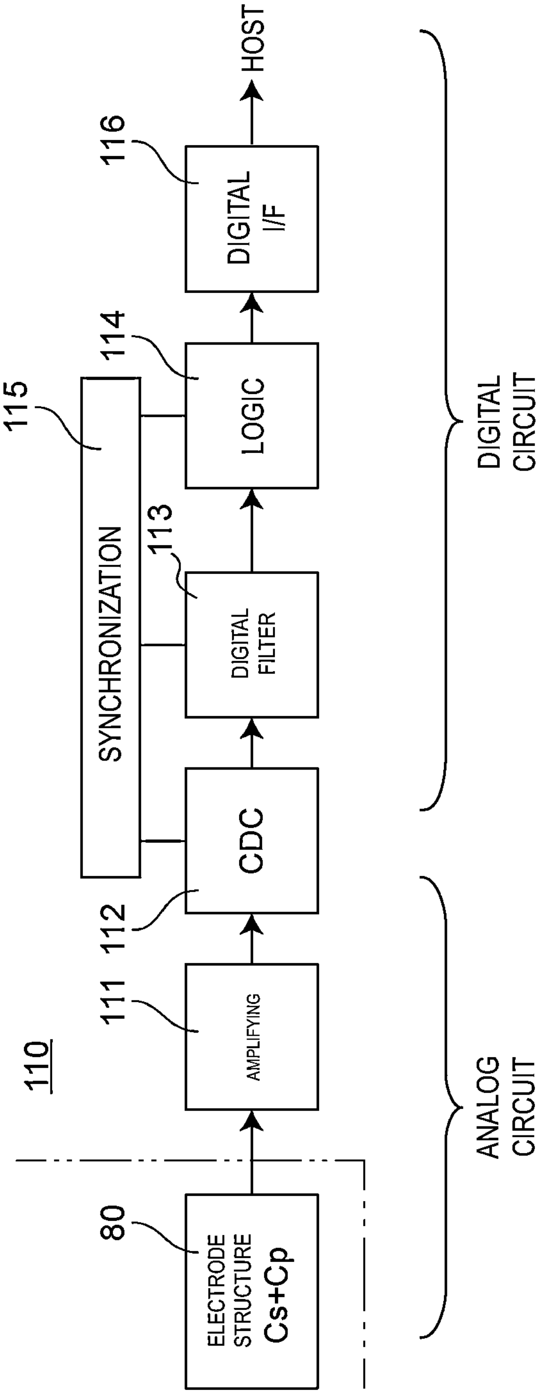
FIG. 16 is a block diagram illustrating one example of a water droplet detection circuit of a sensor device according to the preferred embodiment 3 of the present invention.

FIG. 16 is a block diagram illustrating one example of a water droplet detection circuit of the sensor device according to the preferred embodiment 3 of the present invention. An integrated circuit 110 includes an amplifier 111, a CDC circuit 112, a digital filter 113, a synchronization circuit 115, a logic 114, a digital interface 116, and the like. Note that although it is not illustrated in the drawing, a pulse generator is provided between the electrode structure 80 and the amplifier 111 to supply a rectangular wave voltage to the electrode structure 80. The integrated circuit 110 such as the one described above can be installed as a combination of an arithmetic processor such as a CPU, a GPU, or the like, a memory such as an EEPROM, a RAM, or the like, software, and hardware such as an analog circuit or the like.

The amplifier 111 converts a charge signal from the electrode structure 80 described above into an analog pressure signal and amplifies this analog pressure signal up to an appropriate level. The CDC circuit 112 converts the pressure signal from the amplifier 111 into a digital signal. The digital filter 113 performs filtering on the digital signal from the CDC circuit 112, removes a high frequency noise component, and outputs a signal of a low frequency band.

The logic 114 has the function of storing various programs to be implemented by software. For example, the logic 114 stores therein programs such as a program that performs signal processing on measurement data stored in the memory, a program that control the whole operation of the integrated circuit 110, a program that generates sending data (for example, an alarm) to the external host, a program that performs processing on received data from the external host, and the like.

The synchronization circuit 115 supplies a clock having a predetermined cycle to the CDC circuit 112, the digital filter 113, and the logic 114 in order to synchronize digital operations. Based on this clock, the sampling cycle is set.

The digital interface 114 has the function of communicating with an external host, and transmits and receives a variety of digital data.

Next, the operation of water droplet detection is described. In the state where the vibration plate 83 is disconnected from the reference voltage circuit 93 and no water droplet is attached, Cs_max which is the maximum value of Cs is measured and stored in the memory as a threshold value Ctb in advance. When a water droplet is attached, a parasitic capacitance Cp is generated, and the inter-electrode capacitance Cs changes to Cs+Cp. In the diagnostic mode of water droplet attachment, the inter-electrode capacitance Cs is measured periodically. In this case, Cs is measured by inputting a rectangular pulse to the vibration plate 83. When Cs>Ctb, it can be determined that a water droplet is attached.

Alternatively, the difference ΔC of electrostatic capacitance values before and after a sampling may be measured, and this difference ΔC may be compared with a predetermined threshold value Cta. When ΔC≥Cta, it can be determined that a water droplet is attached.

When the determination of water droplet attachment is made as described above, as is the case with the preferred embodiment 1, the gain adjustment function for the circuitry system and the alarm function can be similarly performed.

In the preferred embodiments described above, the foreign object is exemplified by a water droplet. In addition to the water droplet, attachments of various liquids such as oil, mud, seawater, and the like, various solid objects such as soil, sand, dust, a piece of glass, a piece of metal, a piece of wood, a piece of paper, a piece of cloth, and the like, and various biological substances such as an insect, hair, mold, and the like can also be detected.

With regard to preferred embodiments, the present invention is sufficiently described with reference to the accompanying drawings. However, various variations and modifications are apparent to those skilled in the art. It is to be understood that such variations and modifications are included within the scope of the present invention, provided that such variations and modifications do not deviate from the scope of the present invention described by the attached claims.

According to preferred embodiments of the present invention, the attachment of a foreign object can be reliably detected, and thus, preferred embodiments of the present invention are extremely useful in industries.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sensor device comprising:
- a first electrode being kept at a reference potential;
- a second electrode that changes a position thereof in response to a change of surrounding pressure and faces the first electrode;
- a casing being kept at the reference potential and provided outside the second electrode;
- a capacitance detection circuit to amplify a signal from the second electrode and detect an electrostatic capacitance between the first electrode and the second electrode at a predetermined sampling cycle; and
- a signal processing circuit to measure a difference ΔC of electrostatic capacitance values before and after a sampling, compare the difference ΔC with a predetermined threshold value Cta, and when ΔC>Cta, determine that a foreign object is attached to the casing; wherein
- when the signal processing circuit determines that a foreign object is attached, a gain of the capacitance detection circuit, or a gain of the signal processing circuit, or gains of both the capacitance detection circuit and the signal processing circuit, are adjusted.

2. The sensor device according to claim 1, further comprising:
- an interface circuit to transmit data between the signal processing circuit and an external host; wherein
- when the signal processing circuit determines that a foreign object is attached, an alarm signal is sent to the external host via the interface circuit.

3. The sensor device according to claim 1, wherein the first electrode includes an electrically conductive base substrate.

4. The sensor device according to claim 1, wherein the second electrode includes a membrane.

5. The sensor device according to claim 1, further comprising a spacer to maintain a gap between the first electrode and the second electrode.

6. The sensor device according to claim 5, wherein the spacer includes a guard electrode layer and electrically insulating layers.

7. The sensor device according to claim 1, wherein the casing is a tubular structure made of metal.

8. The sensor device according to claim 1, wherein an inner space of the casing is filled with air or gel.

9. The sensor device according to claim 1, further comprising an integrated circuit including an amplifier, a capacitance-to-digital converter, a digital filter, a temperature sensor, a temperature-to-digital converter, a synchronization circuit, a digital compensator, a memory, and logic and a digital interface.

10. A sensor device comprising:

a first electrode being kept at a reference potential;

a second electrode that changes a position thereof in response to a change of surrounding pressure and faces the first electrode;

a casing being kept at the reference potential and provided outside the second electrode;

a capacitance detection circuit to amplify a signal from the second electrode and detect an electrostatic capacitance between the first electrode and the second electrode; and a signal processing circuit to compare a detected electrostatic capacitance value Cs with a predetermined threshold value Ctb, and when $Cs>Ctb$, determine that a foreign object is attached to the casing; wherein when the signal processing circuit determines that a foreign object is attached, a gain of the capacitance detection circuit, or a gain of the signal processing circuit, or gains of both the capacitance detection circuit and the signal processing circuit, are adjusted.

11. The sensor device according to claim 10, further comprising:

an interface circuit to transmit data between the signal processing circuit and an external host; wherein when the signal processing circuit determines that a foreign object is attached, an alarm signal is sent to the external host via the interface circuit.

12. The sensor device according to claim 10, wherein the first electrode includes an electrically conductive base substrate.

13. The sensor device according to claim 10, wherein the second electrode includes a membrane.

14. The sensor device according to claim 10, further comprising a spacer to maintain a gap between the first electrode and the second electrode.

15. The sensor device according to claim 14, wherein the spacer includes a guard electrode layer and electrically insulating layers.

16. The sensor device according to claim 10, wherein the casing is a tubular structure made of metal.

17. The sensor device according to claim 10, wherein an inner space of the casing is filled with air or gel.

18. The sensor device according to claim 10, further comprising an integrated circuit including an amplifier, a capacitance-to-digital converter, a digital filter, a temperature sensor, a temperature-to-digital converter, a synchronization circuit, a digital compensator, a memory, and logic and a digital interface.

* * * * *